United States Patent [19]
Zittel

[11] Patent Number: 5,427,015
[45] Date of Patent: Jun. 27, 1995

[54] DRUM WITH EXTERIOR FRAME FOR BLANCHERS AND COOLERS

[75] Inventor: David R. Zittel, Columbus, Wis.

[73] Assignee: Lyco Manufacturing, Inc., Columbus, Wis.

[21] Appl. No.: 122,783

[22] Filed: Sep. 15, 1993

[51] Int. Cl.⁶ ............. A23L 3/00; A23N 12/00; A47J 37/12; F25D 25/02
[52] U.S. Cl. .................. 99/348; 99/404; 99/409; 99/516; 134/65; 134/132; 366/234; 366/318
[58] Field of Search .......... 99/348, 403, 404, 409, 99/450, 483, 487, 516, 534, 536, 477–479, 443 R, 443 C; 366/81, 101, 102, 234, 318, 319; 134/65, 132; 62/381; 100/117, 145

[56] References Cited

U.S. PATENT DOCUMENTS

| | | | |
|---|---|---|---|
| 1,168,799 | 1/1916 | Grier | 134/65 |
| 1,251,073 | 12/1917 | Maloney | 134/65 |
| 1,290,396 | 1/1919 | Steere | 134/132 |
| 1,307,508 | 6/1919 | Meakin et al. | |
| 1,422,309 | 7/1922 | Schweinsberg et al. | 134/65 |
| 1,435,285 | 11/1922 | Foster et al. | 134/132 |
| 1,697,875 | 1/1929 | Manning | 134/65 |
| 1,779,046 | 10/1930 | McNaney | 134/132 |
| 2,005,996 | 6/1935 | Kraft | 99/348 |
| 2,288,742 | 7/1942 | Ransohoff | 134/65 |
| 2,299,080 | 10/1942 | De Back | |
| 2,314,871 | 3/1943 | De Back | |
| 2,374,425 | 4/1945 | De Weerth | 99/348 |
| 2,505,371 | 4/1950 | Teepe | |
| 3,146,109 | 8/1964 | Frondorf | |
| 3,253,533 | 5/1966 | Benson | |
| 3,368,278 | 2/1968 | Opie | 366/234 |
| 3,420,157 | 1/1969 | Frish | |
| 3,727,621 | 1/1973 | Morton | |
| 3,754,559 | 8/1973 | Seiwert | |
| 4,072,093 | 2/1978 | Zimmer et al. | |
| 4,410,553 | 10/1983 | McGinty | |
| 4,688,476 | 8/1987 | Zittel | |
| 4,875,344 | 10/1989 | Zittel | |
| 4,942,810 | 7/1990 | Zittel et al. | |
| 5,133,249 | 7/1992 | Zittel | |
| 5,146,841 | 9/1992 | Zittel | |
| 5,182,981 | 2/1993 | Wilcox | |

OTHER PUBLICATIONS

Continuous Rotary Drum Cooler, Lyco Manufacturing, Inc., Columbus, Wisc., date unknown.

Primary Examiner—Timothy F. Simone
Attorney, Agent, or Firm—Lathrop & Clark

[57] ABSTRACT

A cylindrical drum is rotatably mounted within a covered blancher or cooler water tank. The loads of the drum are supported entirely on an exterior frame formed of an inlet end plate and a discharge end plate and a plurality of linear support members which extend between and are welded to the two end plates. A helical auger is welded to and supported by the support members and defines an axially aligned central cavity which is substantially unobstructed between the inlet opening and the discharge opening. A perforated cylinder of screen material surrounds the dram and retains food product therein.

5 Claims, 4 Drawing Sheets

DRUM WITH EXTERIOR FRAME FOR BLANCHERS AND COOLERS

FIELD OF THE INVENTION

The present invention relates to industrial food processing equipment in general and to such equipment which employs rotating product advancement drums in particular.

BACKGROUND OF THE INVENTION

Steam blanchers and chilled water coolers have long been used in the food processing industry to blanch, cook, or cool a continuous throughput of food product such as pasta, green peas, corn, beans and other processed food products. Helical augers mounted within a perforated drum suspended in a water-filled tank have long been used to good effect. The perforated steel screen skin of the drum allows water to flow freely into the interior of the drum, and the auger within the drum gently advances food product from the tank inlet to the tank discharge end as the dram is rotated.

At one time, augers for such apparatus were mounted on a central drive shaft and were driven directly by an engaged sprocket and motor. A central drive shaft, however, presented several problems. First, the extension of the drive shaft axially through the inlet end of the tank interfered with the introduction of food product into the cylindrical drum. Furthermore, food product coming into contact with the central shaft was subject to damage. In addition, experience showed that central drive shafts of narrow diameter were prone to breakage.

Subsequent rotatable drum coolers and blanchers eliminated the breakage problem of the central drive shaft by mounting the helical auger flights on a central cylindrical core which extended through the inlet and outlet ends of the blancher tank to define cylindrical journals which were supported on two rotatable trunnions at each end. The cylindrical core in this type of apparatus is of sufficient diameter to allow the introduction of an infeed chute through the inlet journal. To allow the food product to pass into and exit from the cylindrical drum, the core is replaced at the inlet and outlet ends of the drum with a number of structural steel bars symmetrically spaced a distance from the rotational axis of the drum equal to the radius of the core. These bars provided admirable stiffness and did not interfere with the introduction of the infeed chute, although sometimes did conflict with the introduction of delicate food product.

An apparatus which provided no interference with infed food product was disclosed in my own prior U.S. Pat. No. 5,146,841, to an open-throat blancher. This apparatus utilized a drum composed of supporting C-channels which contributed to the carrying of the loads of the auger along with the assistance of a central core tube which was rigidly fixed to the end plate.

Food processing machine, which is typically subjected to varying extremes of temperature, liquids, and organic contaminates, must be highly resistant to corrosion. To address this need blanchers and coolers are commonly fabricated of stainless steel, a material which is not only costly by weight, but which requires skilled craftsmanship to work.

What is needed is a rotating drum food processing apparatus which may be manufactured at reduced cost yet which does not suffer in performance.

SUMMARY OF THE INVENTION

The rotating drum blancher or cooler of this invention achieves dramatic reductions in manufacturing costs by eliminating entirely the central core hitherto employed in prior art devices, and supports the loads of the auger entirely on an exterior frame formed of linear support members and rigid end plates. This stiff load-bearing drum is lighter in weight and hence lower in cost than one having a central core, and is simplified in construction.

It is an object of the present invention to provide a blancher or cooler of reduced weight.

It is another object of the present invention to provide a blancher or cooler having a rigid auger and drum assembly.

It is also an object of the present invention to provide a food advancement drum for a blancher or cooler of reduced cost.

Further objects, features and advantages of the invention will be apparent from the following detailed description when taken in conjunction with the accompanying drawings.

DESCRIPTION OF THE PREFERRED EMBODIMENT

Figure 1:
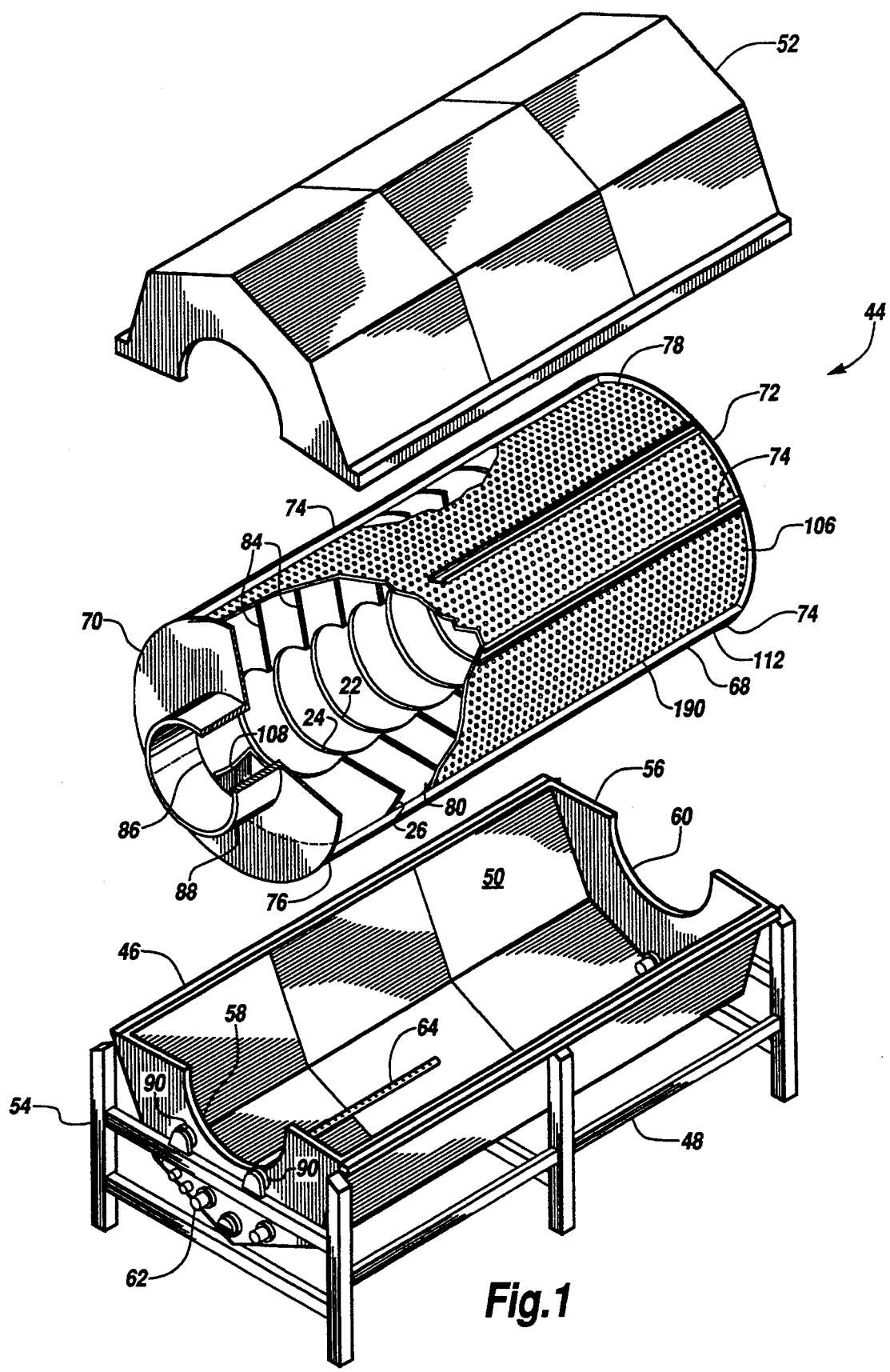
FIG. 1 is an exploded isometric view of the food processing apparatus of the present invention.

Referring more particularly to FIGS. 1–5, wherein like numbers refer to similar parts, a rotating drum food processing apparatus 44 is shown in FIG. 1.

The apparatus 44 of the present invention provides a rigid drum structure for a cooler or blancher which completely eliminates the central corn which was utilized in the prior art. This coreless blancher or cooler drum has the necessary stiffness and durability to provide the required satisfactory performance for the apparatus, while being much less costly to manufacture due to the reduced amount of raw materials utilized. The apparatus 44 has an elongated open top tank 46 which is supported by a frame 48. The tank 46 has a segmented wall 50 with a plurality of drains (not shown) located at its lowest portion. An elongated vaulted cover 52 fits over and covers the tank 46. The apparatus 44 has an inlet end 54 and a discharge end 56. Portions of the tank and cover define an inlet opening 58 at the inlet end 54 and a discharge opening 60 at the discharge end 56.

The inlet end of the tank 46 has a fixture 62 for the admission of steam or chilled water through the manifold 64 located on the tank wall 50 within the tank 46. Cleanout ports are also located in each end of the tank 46. Fixtures are also provided in the inlet end of the tank 46 for introduction of a thermometer and thermocouple (not shown) for monitoring the temperature of the fluid contained within the tank. The cover 52 is hinged to the tank 46 in a known manner and may be hingedly attached to the tank such that it may be opened from either side of the apparatus 44 as in the manner disclosed in U.S. Pat. No. 4,788,476 to Zittel, the disclosure of which is hereby incorporated by reference.

Figure 2:
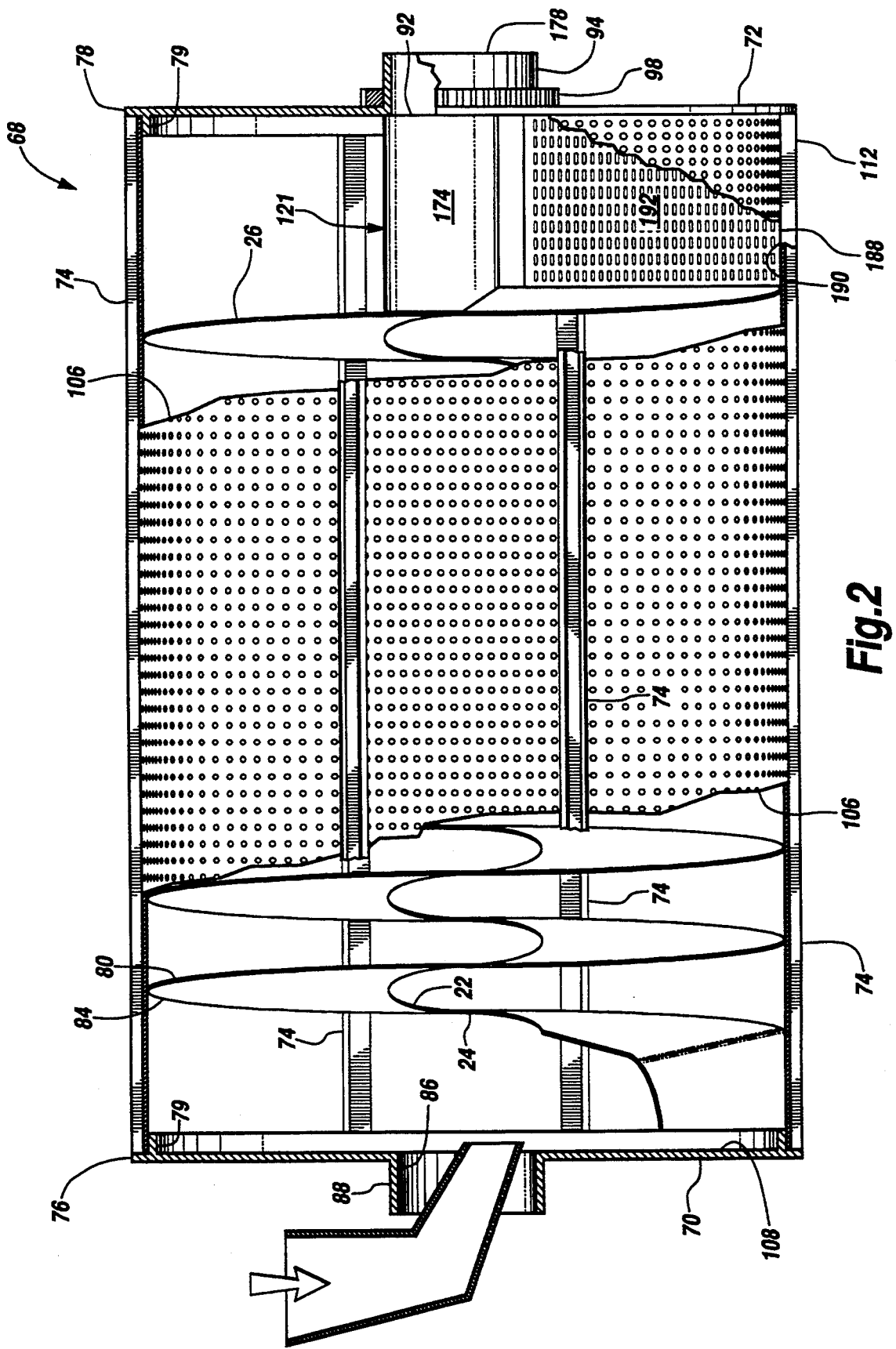
FIG. 2 is a side elevational view, partly broken away, of the drum of the apparatus of FIG. 1.
Figure 4:
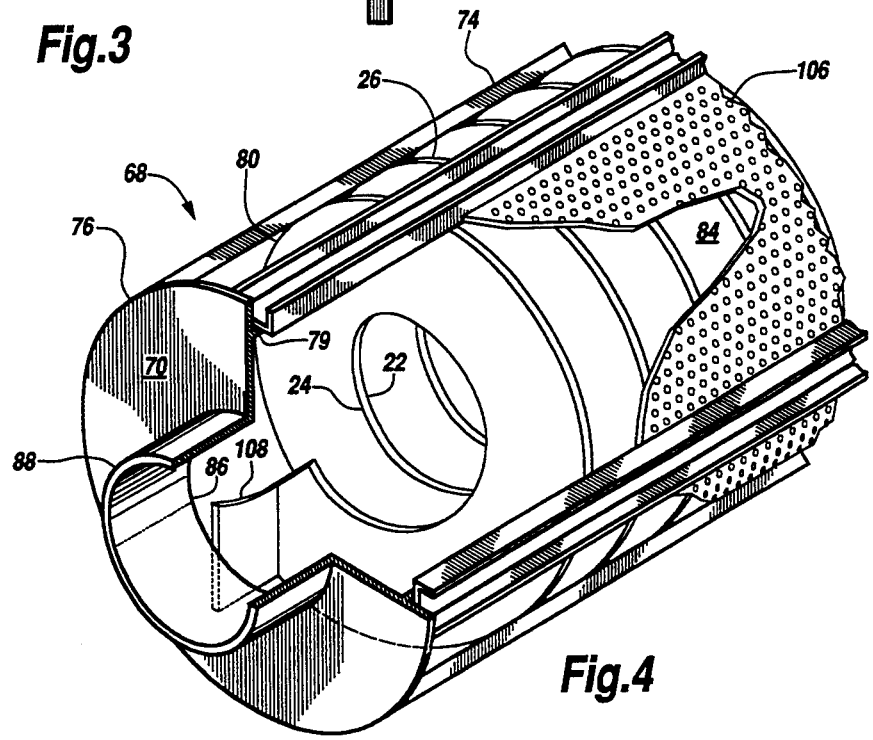
FIG. 4 is a fragmentary isometric view, partially broken away, of the inlet end of the drum of FIG. 2.

A cylindrical drum 68 is rotatably mounted within the tank 46. The rigid support structure of the drum 68 is formed by two spun stainless steel end plates 70, 72 which are connected by six C-channel support members 74 which extend axially between the inlet end plate 70 and the discharge end plate 72. The support members 74 are connected to the peripheral edges 76, 78 of the end plates 70, 72. The support members 74 may be welded directly to the flat end plates 70, 72, but in a preferred embodiment, as shown in FIGS. 2 and 4, the end plates are provided with inwardly extending annular lips 79 to which the support members are connected. These lips 79 provide added strength and rigidity to the drum structure.

The drum 68 is enclosed by a cylinder composed of a plurality of perforated plates 106 attached between the support members 74 to surround the helical auger 80. In a preferred drum, some of the plates will be removably attached to permit access to the drum interior for cleaning. In an exemplary embodiment, the drum 68 is approximately twelve feet in length and nine feet in diameter.

Figure 3:
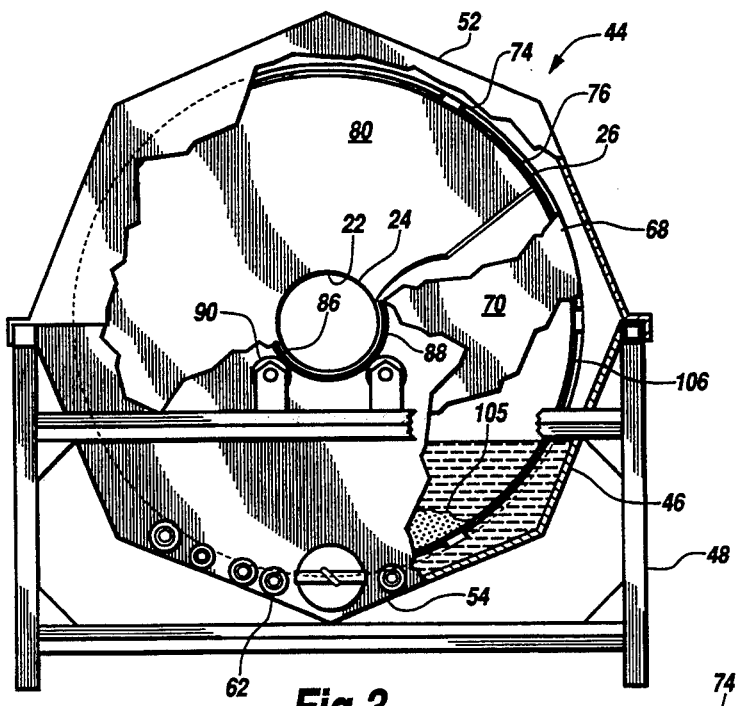
FIG. 3 is a front elevational view, partly broken away, of the apparatus of FIG. 1 showing the inlet end.

It should be noted that the perforated plates 106 in FIGS. 2–4, have been depicted with the relative dimensions of the perforations exaggerated for clarity. In general, perforations will be selected of a size sufficient to retain the food product 105 within the drum 68.

The auger 80 is supported entirely by the support members 74 and hence the end plates 70, 72. The auger 80 has an interior helical edge 22 which spirals about and defines a central axial opening 24 which extends through the auger 80. The central axial opening is cylindrical and, in an exemplary embodiment, is approximately two feet in diameter. The auger 80 has a helical exterior peripheral edge 26 which spirals about the auger and which is fixed to the C-channel support members 74 at the points of engagement between the support members and the auger. Because the auger is not supported on a central core, the auger is unobstructed along the axial opening 24. The interior edge 22 is thus not connected to any supporting structure. The drum 68 is thus economically produced by obviating the need for an internal core.

For example, a typical prior art blancher drum may be twelve feet long and nine feet in diameter, with a central supportive corn which is two feet in diameter. If the central core is fabricated of one-quarter-inch thick stainless steel plate it will consume over 200 pounds of stainless steel. The materials and fabrication cost of this structure is entirely avoided by the apparatus of this invention.

The inlet end plate 70 has portions defining a circular inlet opening 86. A cylindrical journal 88 extends outwardly from the inlet end plate 70. The journal 88 is supported on two rotatable trunnions 90 which are mounted to the frame 48 outside the tank 46 inlet opening 58. The diameter of the inlet opening 86 in the inlet end plate 70 may be selected to suit the particular needs of the processing application.

Portions of the discharge end plate 72 define a discharge opening 92 for the exit of food product from the apparatus 44. A cylindrical journal 94 extends from the discharge end plate 72 around the discharge opening 92 and is supported on trunnions (not shown) mounted to the frame 48.

A drive sprocket 98, shown in FIG. 2, is mounted to one of the drum journals inwardly of the supporting trunnions and is driven by an electric motor (not shown) to rotate the drum at a desired speed. The drive sprocket 98 may be located at either end of the drum 68.

An infeed flight attachment 108 extends between the inlet end plate 70 and the first flight 84 of the helical auger 80. The attachment 108 serves to initially engage the infed food product 105 with the auger 80.

Figure 5:
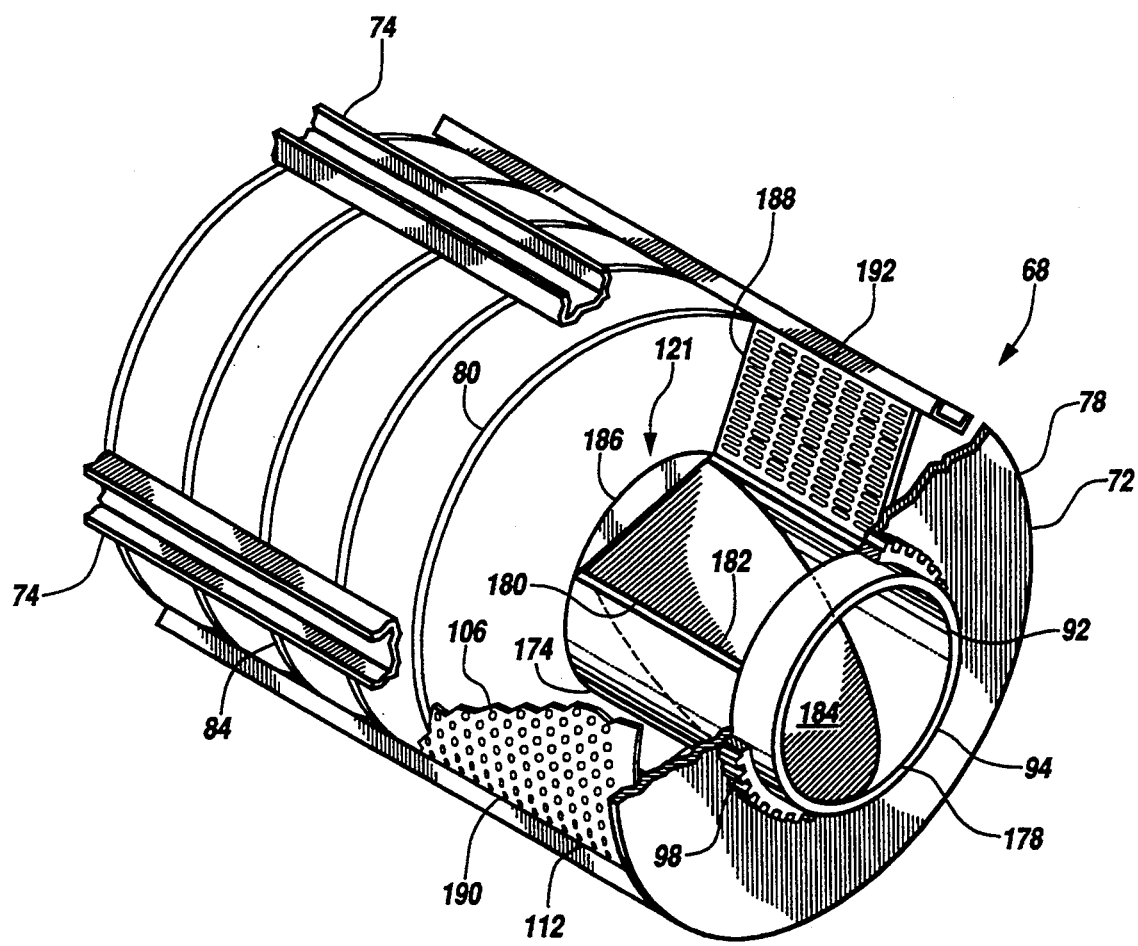
FIG. 5 is a fragmentary isometric view, partially broken away, of the discharge end of the drum of FIG. 2.

The food product is advanced through the drum 68 by the auger 80 until the food product reaches the discharge end region 112 of the drum, shown in FIG. 5. The auger 80 terminates at a point spaced from the discharge end plate 72. Conventional lifting buckets may extend between the auger and the discharge end plate 72. However, in applications in which particular care must be taken not to damage the processed food product, as for example in handling bagged or pouched products such as soup, a single scoop discharge 121 may be employed.

The discharge 121 has a semi-cylindrical chute 174 which is fixed to the drum 68. The chute 174 extends between the auger 80 and the discharge end plate 72 of the drum 68. The chute 174 has a discharge opening 178 which communicates with the outlet opening 92 of the drum 68 in the discharge end plate 72. The chute 174 has an inclined surface 184 which extends from the rear wall 186 of the chute to the discharge opening 78. The discharge 121 has a single lifting flight 188 which extends between the side wall 190 of the drum 68 and the chute 174. The lifting flight 188 has a perforated base plate 192 which is welded to one lip 182 of the chute along the chute inlet opening 180. The discharge 121 elevates food product from the water filled portions of the drum to the discharge outlet of the discharge end plate.

The drum may also be provided with any conventional discharge arrangement, such as a plurality of lifting flights attached radially to the exterior of the drum to rotate about a discharge chute that remains fixed.

It should be noted that the apparatus of this invention, in addition to being of reduced cost, permits the radial height of the auger flights to be set at a desired level, without any requirement that the auger extend inwardly a prescribed distance to meet a central core.

It should be noted that the blancher or cooler of this invention may be formed from other corrosion resistant materials in addition to stainless steel and that the number and angle of the auger flights may be varied as desired. Furthermore, although six C-channel support members have been illustrated, a greater or lesser number of members may be employed depending on the overall dimensions of the drum.

It is understood that the invention is not limited to the particular embodiments disclosed and illustrated herein, but embraces such modified forms thereof as come within the scope of the following claims.

I claim:

1. A food processing apparatus comprising:
   a) a tank having an inlet end and a discharge end;
   b) an inlet end plate positioned within the tank adjacent the inlet end, the inlet end plate having portions defining an inlet opening;

c) a discharge end plate positioned within the tank adjacent the tank discharge end, the discharge end plate having portions defining a discharge opening;
d) a plurality of linear support members extending between and connecting the inlet end plate and discharge end plate, wherein the end plates and support members define a drum rotatably mounted within the tank;
f) a cylindrical sidewall, formed of perforated material which extends between the inlet end plate and the discharge endplate and which is connected to the support members;
e) a helical auger having an outer peripheral edge which is connected to the support members, wherein the auger has an inner peripheral edge which defines an internal axially extending opening, and wherein the opening is radially unobstructed between the inner peripheral edge of the auger.

2. The apparatus of claim 1 further comprising:
a) a frame to which the tank is connected;
b) a plurality of trunnions rotatably mounted to the frame exterior to the tank; and
c) a cylindrical journal which extends axially outwardly from the drum and which is supported on the trunnions, the journal defining an interior cylindrical opening which is aligned with and of substantially the same diameter as the axially extending drum opening defined by the auger.

3. A food processing apparatus comprising:
a) a tank adapted to contain water at a desired level;
b) a perforated cylindrical drum rotatably mounted within the tank, the drum having a structural frame comprised of an inlet end plate connected to a discharge end plate by a plurality of linearly extending stiff support members, wherein the inlet end plate has portions defining an inlet opening for the introduction of food product and the discharge end plate having portions defining a discharge opening for the discharge of food product; and
c) a substantially helical auger mounted within the drum and fixedly connected to the support members of the structural frame, wherein the auger is substantially entirely supported by the support members and end plates of the drum, and wherein the helical auger defines an unobstructed axially extending cavity running centrally within the drum between the inlet opening and the discharge opening.

4. The apparatus of claim 3 wherein the unobstructed axially extending cavity is of a first diameter, the apparatus further comprising:
a) a frame to which the tank is connected;
b) a plurality of trunnions rotatably mounted to the frame exterior to the tank; and
c) a cylindrical journal which extends axially outwardly from the drum and which is supported on the trunnions, the journal defining an interior cylindrical opening which is aligned with and of substantially the same diameter as the axially extending drum cavity defined by the auger flights.

5. In a food processing apparatus of the type having a perforated cylindrical drum rotatably mounted within a water-filled tank, and having a helical auger extending from proximate a drum inlet end to proximate a drum discharge end, the improvement comprising support members engaging an exterior peripheral edge of the auger to support the auger in fixed position within the perforated, cylindrical drum and an interior peripheral edge of the auger which define a radially unobstructed axially extending interior opening.

* * * * *